Aug. 4, 1936.  F. E. HOLMES  2,049,775
FLUID CONTROL DEVICE
Filed Oct. 13, 1934   2 Sheets-Sheet 2

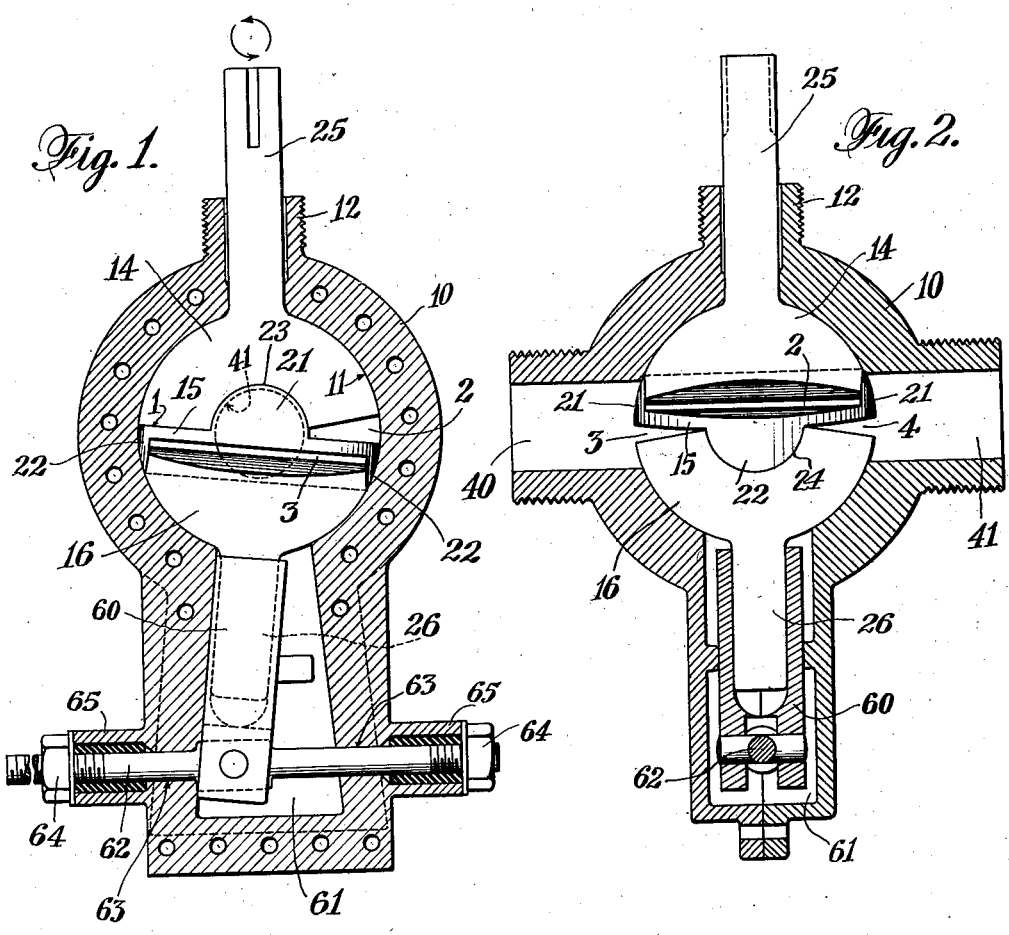
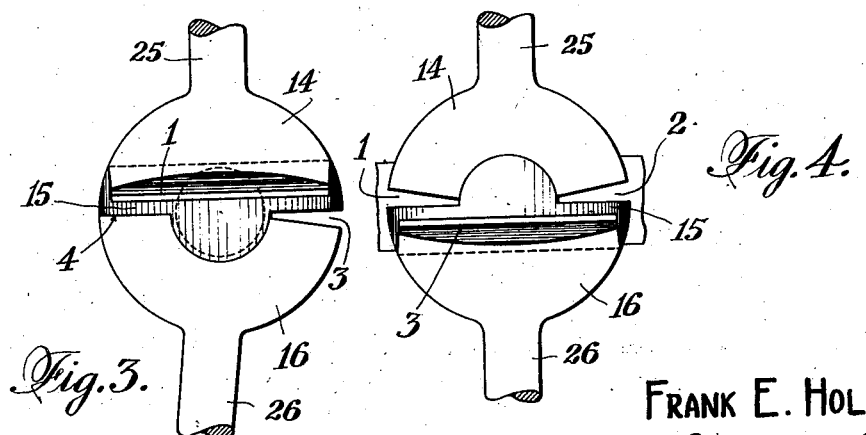

Inventor
FRANK E. HOLMES
By Joseph H. Lipschutz
Attorney

Patented Aug. 4, 1936

2,049,775

UNITED STATES PATENT OFFICE 2,049,775

FLUID CONTROL DEVICE

Frank E. Holmes, Pasadena, Calif.

Application October 13, 1934, Serial No. 748,235

12 Claims. (Cl. 103—117)

This invention relates to fluid control devices such as pumps and motors. More particularly, the invention relates to that type of pump which is capable of adjustment whereby the device may deliver a volume of fluid variable at will in accordance with the adjustment of the device while maintaining a given speed of operation of the driving element thereof. My invention contemplates not only an infinitely variable pump but one whose direction of operation may be varied at will.

A further object of this invention is to provide a fluid pump of the type described which is of simple construction requiring a minimum number of parts and operating with but a single inlet and a single outlet.

Further objects and advantages of this invention will become apparent in the following detailed description thereof.

In the accompanying drawings,

Fig. 1 is a vertical section through the casing of my pump disclosing the operating parts thereof.

Fig. 2 is a vertical section taken at right angles to the Fig. 1 section, and disclosing the left-hand portion.

Figs. 3 and 4 are views corresponding to Figs. 1 and 2 with the casing removed and the operating parts in positions 90° out of phase with the positions of the parts in Figs. 1 and 2 respectively.

Figure 5:
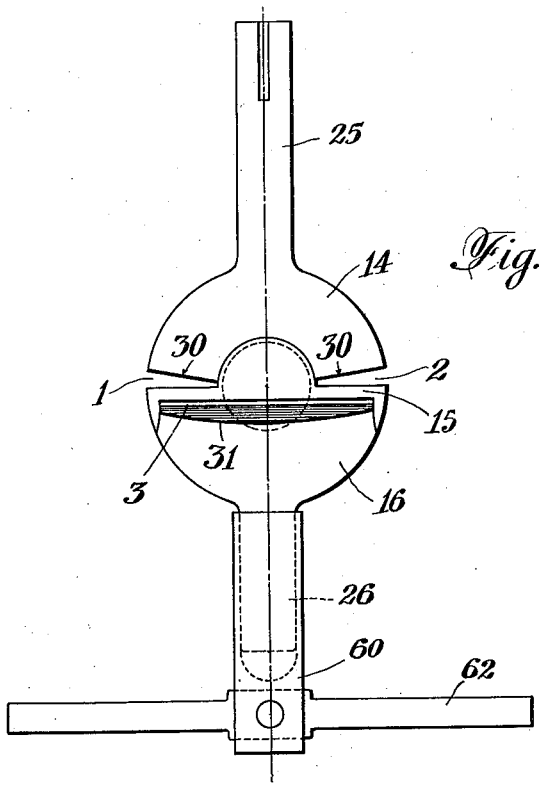

Fig. 5 is a view similar to Fig. 1 but with the casing removed and with the operating parts in neutral or ineffective positions.

Figure 6:
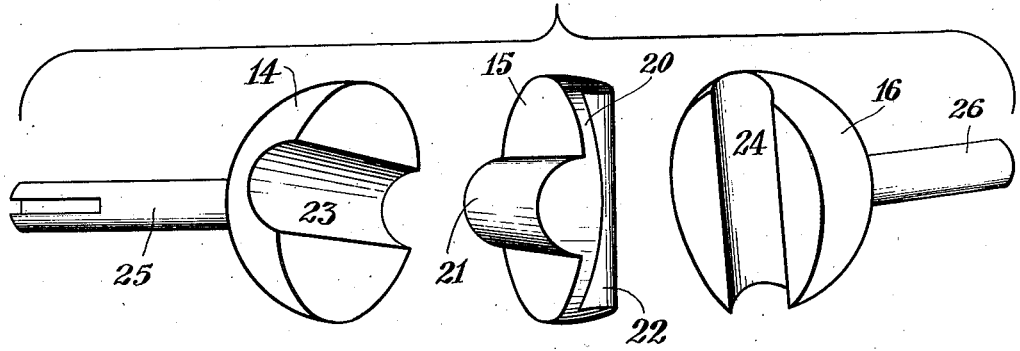

Fig. 6 is a disassembled view of the operating elements of the pump, said elements being shown in perspective.

The principle of operation of my pump can best be disclosd in connection with the figures of the drawings. The theory of this pump is the creation of a plurality of expanding and contracting chambers which are designed to receive and discharge the fluid alternately during each revolution of the operating parts. The method whereby I create said chambers is as follows:

The operating parts are enclosed within a casing 10 consisting of two similar, detachable parts forming a substantially spherical, hollow interior portion 11 and bearing portion 12. Within the spherical portion 11 are positioned the three operating elements 14, 15 and 16. Elements 14 and 16 are similar and comprise substantially hemi-spherical portions, each of which is slightly less in volume than a hemisphere by the amount of two segments cut from each side of a diameter, so that when said portions are fitted within the spherical portion 11 of said casing 10 there is a certain amount of play. Within this area of motion there is provided the element 15 which forms also a universal joint between the members 14 and 16. For this purpose element 15 consists of a plate 20 which is provided with semi-cylindrical journal portions 21 and 22 on opposite surfaces thereof, said journal portions being at right angles to each other and socketed in semi-cylindrical bearing portions 23 and 24 within the respective members 14 and 16. It will thus be seen that a universal driving connection is established between members 14 and 16, so that the axes of rotation of said members may be adjusted relative to each other at will and rotary motion may nevertheless be transmitted from one to the other. Each of said members 14 and 16 is provided with a journal portion 25 and 26 extending through the bearing portion 12 and adjustment chamber 61 of the casing 10 respectively. The journal portion 25 of member 14 fits closely within bearing 12 and is adapted to be driven from any suitable source of power when the device is operated as a pump.

The journal portion 26 extends loosely into the adjustment chamber 61 within which it may be moved (in the plane of the paper in Fig. 1) so that the axis of rotation of member 16 may be either in line or out of line with respect to the axis of rotation of member 14. If the members 25 and 26 are in line as shown in Fig. 5, then the parts assume the position shown in said figure, and upon rotation of member 14 all of said parts 14, 15 and 16 rotate about the same vertical axis. It will be seen that the fact that said members 14 and 16 have segments thereof cut away as shown at 30 and 31 symmetrically with respect to the vertical axis, causes the formation of four chambers, two upper chambers 1 and 2, and two lower chambers 3 and 4. When the axes of members 25 and 26 are in the same vertical line as shown in Fig. 5, then throughout a complete revolution of said members the chambers 1, 2, 3 and 4 remain of constant size without expansion or contraction. Under such conditions there is obviously no pumping action and any fluid that would be fed into these chambers at one side would be discharged at the other side without additional pressure.

In order to create pumping action it is necessary that the chambers 1, 2, 3 and 4 alternately expand and contract in the course of a revolution. Also, it is necessary that such expansion and contraction take place with reference to the inlet and outlet ports. Such ports are provided in the casing 10 at 40 and 41. Thus, if in Figs. 1 and 2 the shaft 25 is rotating counter-clockwise, 40 is the inlet through which fluid is fed into the chambers 1, 2, 3 and 4, and 41 is the outlet through which the fluid is discharged. In order to cause said chambers 1, 2, 3 and 4 to expand for receiving fluid and contract for discharging fluid at regular intervals throughout a revolution, it is necessary to offset the axis of journal portion 26 with respect to the axis of journal portion 25 (in the plane of the paper in Fig. 1) and at right angles to the plane of inlet 40 and outlet 41. Thus, by referring to Fig. 1 it will be seen that with the journal portion 26 moved a maximum distance to the left (in said figure) there is set up in the course of such revolution an oscillatory or wobble action of the intermediate, oscillatable plate 15 whereby each point of said plate moves through a complete oscillation consisting of a downward movement and an upward movement once throughout each revolution of the pump members. This means that each chamber 1, 2, 3 and 4 in the course of a revolution will expand and contract once.

It will be seen that the two chambers on each side of member 15 extend for substantially half a revolution less that portion occupied by the journal portion 21 or 22. Thus, chambers 1 and 2 on the upper surface and chambers 3 and 4 on the lower surface each occupy half a revolution, less the width of the journal portion 21 or 22 respectively. Said journal portions 21 and 22 are of such diameter that they extend across inlet 40 or outlet 41 and prevent communication of the chambers with both the inlet and outlet side at the same time. Thus, for instance, in Fig. 2 the end of journal portion 21 occupies the entire distance across the inlet 40 and prevents chambers 1 and 2 from communicating with both the inlet 40 and outlet 41 at the same time. As the parts continue to rotate in a counter-clockwise direction, the left-hand end of chamber 2 in Fig. 2 moves away from inlet 40 and into communication with outlet 41.

By arranging the parts as shown in Figs. 1 and 2, that is, with the plane of adjustment of the axis of journal portion 26 at right angles to the plane of inlet 40 and outlet 41, the chambers 1, 2, 3 and 4 are successively caused to open as they begin to communicate with inlet 40 to receive fluid and remain open until they have passed out of communication with said inlet 40, and then commence to close as they successively begin to communicate with outlet 41 to squeeze the fluid out under pressure, in other words, to provide the pumping action. The operation will become apparent from a study of Figs. 1 and 3 and corresponding Figs. 2 and 4, which illustrate one half-revolution of the parts, the second half-revolution being a duplicate of the first half. Thus, in Fig. 1 where the inlet 40 is in a plane perpendicular to the paper, we see that chamber 1 is just coming into communication with inlet 40 and is about to begin to open to receive fluid. Chamber 2 is just leaving inlet 40 and is open and full of fluid. Lower chamber 3 is partly open for receiving fluid, and lower chamber 4 (see Fig. 2) is partly closed, that is, has partly discharged its fluid. Fig. 2 shows these parts in a right angle view. Fig. 3 shows the parts moved through a quarter revolution. We now see that chamber 1 is in communication with inlet 40, having opened part-way. Chamber 3 is completely filled preparatory to discharging into outlet 41, while chamber 4 has completed its discharge and is closed just preparatory to coming into engagement with inlet 40 to be filled again. Chamber 2 is partly discharged.

The next turn of the parts through 90° brings them back to the position of Fig. 1, except that chambers 1 and 2 are interchanged, as are chambers 3 and 4. A further turn of 90° brings the parts into the same position shown in Fig. 3 except that chambers 1 and 2 are interchanged as are chambers 3 and 4. And finally, the last turn of 90° brings the parts back to the position shown in Fig. 1. This description of operation discloses that each of the four chambers in passing the inlet 40 receives fluid and in passing outlet 41 discharges the same.

The amount of contraction and expansion of each chamber 1, 2, 3 and 4 depends upon the degree to which the axis of journal portion 26 has been displaced with respect to the axis of journal portion 25. When these axes are in line as shown in Fig. 5 there is no expansion or contraction of said chambers in the course of a revolution, but as said axes are displaced with respect to each other the expansion and contraction of each chamber in the course of a revolution increases. Since the amount of pumping is a direct function of the amount of expansion and contraction of said chambers, such pumping may be adjusted at will by controlling the displacement of the axes of said portions 25 and 26. Since the members 14 and 16 are housed within a spherical interior 11 in casing 10 and are connected by a universal connection, either of said members may be freely adjusted, but in the construction shown the member 26 is the one that is adjusted. For this purpose it may be housed within a movable block 60, said block being guided in a housing or adjustment chamber 61 formed within the casing 10 and adjusted by any suitable means which will cause swinging of said member 26 (in the plane of the paper in Fig. 1). One such means is disclosed as a link 62 guided in casing 10 on bearing portions 63 and linearly movable by any suitable means, as for instance by lock-nuts 64 threaded thereon and bearing against stop-members 65 so that said link 62 may be moved in one direction or the other to vary the angular displacement of journal member 26 and hence hemispherical member 16.

Not only may the degree of pumping be varied by displacing said journal member 26, but the direction of pumping may be reversed, without reversing the direction of rotation of driving shaft 25, by moving said member to one side or the other of the axis of member 25. Thus, by moving the journal member 26 to the right in Fig. 1 past the axis of member 25, the opening and closing of chambers 1, 2, 3 and 4 with respect to ports 40 and 41 is reversed and said chambers will close as they pass port 40 instead of opening, so that said port becomes the discharge port, while said chambers will open as they pass port 41 so that the latter port becomes the inlet port.

When it is desired to utilize the device hereinbefore described as a motor instead of a pump, then instead of shaft 25 being the driving shaft it becomes the driven shaft by reason of the fact that fluid under pressure is supplied to the inlet port 40 and will, in forcing its way through to outlet 41, cause oscillation of the oscillatable plate 15; and the same sequence of operation will take place as before, except that such oscillations of plate 15 result in driving the shaft 25 in one direction or the other depending upon the setting of shaft 26.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A device of the nature described comprising a housing having a plurality of ports, and a plurality of parts rotatable within said housing, said parts comprising end members and an intermediate oscillatable member, said intermediate member having journal portions whereby it is pivotally connected to said end members, said journal portions coacting with said ports to form valves therefor.

2. A device of the nature described comprising a housing having a plurality of ports, and a plurality of parts rotatable within said housing, said parts comprising end members and an intermediate oscillatable member, said intermediate member having journal portions whereby it is pivotally connected to said end members, said journal portions extending across the interior of said housing and coacting at opposite ends with said ports to form valves therefor, the ends of said journal portions being larger than said ports.

3. A device of the nature described comprising a housing having a plurality of ports, and a plurality of parts rotatable within said housing, said parts comprising end members and an intermediate oscillatable member, said intermediate member having substantilly semi-cylindrical journal portions whereby said intermediate member is pivotally connected to said end members, said journal portions extending across the interior of said housing and coacting at opposite ends with said ports to form valves therefor.

4. A device of the nature described comprising a housing having a plurality of ports, and a plurality of parts rotatable within said housing, said parts comprising end members and an intermediate oscillatable member, said intermediate member having substantially semi-cylindrical journal portions on opposite surfaces thereof whereby said intermediate member is pivotally connected to said end members, said journal portions extending across the interior of said housing and coacting at opposite ends with said ports to form valves therefor.

5. A device of the nature described comprising a housing having a single inlet port and a single outlet port, and a plurality of parts rotatable within said housing, said parts comprising end members and an intermediate oscillatable member, said intermediate member having journal portions whereby it is pivotally connected to said end members, said journal portions coacting with said ports to form valves therefor.

6. A device of the nature described comprising a housing having a single inlet port and a single outlet port, and a plurality of parts rotatable within said housing, said parts comprising end members and an intermediate oscillatable member, said intermediate member having substantially semi-cylindrical journal portions whereby said intermediate member is pivotally connected to said end members, said journal portions extending across the interior of said housing and coacting at opposite ends with said ports to form valves therefor.

7. A device of the nature described comprising a housing having a single inlet port and a single outlet port, and a plurality of parts rotatable within said housing, said parts comprising end members and an intermediate oscillatable member, said intermediate member having substantially semi-cylindrical journal portions on opposite surfaces thereof whereby said intermediate member is pivotally connected to said end members, said journal portions extending across the interior of said housing and coacting at opposite ends with said ports to form valves therefor.

8. A device of the nature described comprising a housing having a spherical interior and a plurality of ports, and a plurality of parts rotatable within said housing, said parts comprising substantially hemispherical end members and an intermediate oscillatable member, said intermediate member having journal portions on opposite surfaces thereof whereby it is pivoted to said end members, said journal portions extending across the interior of said housing and coacting at opposite ends with said ports to form valves therefor.

9. A device of the nature described comprising a housing having a spherical interior and a plurality of ports, and a plurality of parts rotatable within said housing, said parts comprising substantially hemispherical end members and an intermediate oscillatable member, said intermediate member having a substantially semi-cylindrical journal portion on each surface thereof whereby said intermediate member is pivotally connected to said end members, said journal portions being positioned at right angles to each other for universal movement of one end member relative to the other end member, said journal portions extending across the interior of said housing and coacting at opposite ends with said ports to form valves therefor.

10. A device of the nature described comprising a housing having a spherical interior and a single inlet port and a single outlet port, and a plurality of parts rotatable within said housing, said parts comprising substantially hemispherical end members and an intermediate oscillatable member, said intermediate member having journal portions on opposite surfaces thereof whereby it is pivoted to said end members, said journal portions extending across the interior of said housing and coacting at opposite ends with said ports to form valves therefor.

11. A device of the nature described comprising a housing having a spherical interior and a single inlet port and a single outlet port, and a plurality of parts rotatable within said housing, said parts comprising substantially hemispherical end members and an intermediate oscillatable member, said intermediate member having a substantially semi-cylindrical journal portion on each surface thereof whereby said intermediate member is pivotally connected to said end members, said journal portions being positioned at right angles to each other for universal movement of one end member relative to the other end member, said journal portions extending across the interior of said housing and coacting at opposite ends with said ports to form valves therefor.

12. A device of the nature described comprising a housing having a spherical interior and a plurality of ports, a plurality of parts rotatable within said housing, said parts comprising substantially hemispherical end members and an intermediate oscillatable member, said intermediate member having a substantially semi-cylindrical journal portion on each surface thereof whereby said intermediate member is pivotally connected to said end members, said journal portions being positioned at right angles to each other for universal movement of one end member relative to the other end member, and means whereby the axis of rotation of one of said hemispherical members may be adjusted relative to the axis of rotation of the other of said members, said journal portions extending across the interior of said housing and coacting at opposite ends with said ports to form valves therefor.

FRANK E. HOLMES.